US012360851B2

(12) United States Patent
Montero et al.

(10) Patent No.: US 12,360,851 B2
(45) Date of Patent: Jul. 15, 2025

(54) MANAGING DATA BACKUP FOR DATA PROCESSING SYSTEMS USING OUT-OF-BAND METHODS

(71) Applicant: Dell Products L.P., Round Rock, TX (US)

(72) Inventors: Adolfo Sandor Montero, Pflugerville, TX (US); Abeye Teshome, Austin, TX (US); Richard M. Tonry, Georgetown, TX (US); Bassem El-Azzami, Austin, TX (US); Mohit Arora, Frisco, TX (US); Vinodkumar Vasudev Ottar, Mckinney, TX (US); Luis Antonio Valencia Reyes, Waxahachie, TX (US); Rajaravi Chandra Kollarapu, Allen, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/498,363

(22) Filed: Oct. 31, 2023

(65) Prior Publication Data

US 2025/0138948 A1 May 1, 2025

(51) Int. Cl.
*G06F 11/00* (2006.01)
*G06F 11/07* (2006.01)
*G06F 11/14* (2006.01)

(52) U.S. Cl.
CPC ........ *G06F 11/1451* (2013.01); *G06F 11/079* (2013.01); *G06F 11/1464* (2013.01)

(58) Field of Classification Search
CPC . G06F 11/1451; G06F 11/079; G06F 11/1464
See application file for complete search history.

(56) References Cited

U.S. PATENT DOCUMENTS

| | | |
|---|---|---|
| 5,283,905 A | 2/1994 | Saadeh |
| 5,367,670 A | 11/1994 | Ward |
| 5,402,431 A | 3/1995 | Saadeh |
| 7,590,760 B1 | 9/2009 | Banks |
| 7,599,907 B2 | 10/2009 | Havewala et al. |
| 8,020,192 B2 | 9/2011 | Wright et al. |
| 8,490,163 B1 | 7/2013 | Harsell et al. |
| 8,850,186 B2 | 9/2014 | Yamauchi |
| 9,191,781 B2 | 11/2015 | Kumar |
| 9,246,678 B2 | 1/2016 | Nayshtut et al. |
| 9,349,009 B2 | 5/2016 | Rivera |

(Continued)

*Primary Examiner* — Elmira Mehrmanesh
(74) *Attorney, Agent, or Firm* — WOMBLE BOND DICKINSON (US) LLP

(57) ABSTRACT

Methods and systems for managing data stored by a data processing system are disclosed. A management controller of the data processing system may identify an occurrence of a backup event for the data, the occurrence indicating that a portion of the data is to be backed up to a remote storage system. In response to the occurrence, the management controller may initiate a backup process to obtain a backup data package for the data processing system. The management controller may provide the backup data package to the remote storage system via an out-of-band communication channel in order to facilitate completion of the backup process. By doing so, the data may be placed in a restorable state, enabling the data processing system to continue providing computer-implemented services.

20 Claims, 6 Drawing Sheets

(56) References Cited

U.S. PATENT DOCUMENTS

| | | |
|---|---|---|
| 9,721,111 B2 | 8/2017 | Cavanaugh |
| 9,721,175 B2 | 8/2017 | Kursun et al. |
| 9,785,491 B2 | 10/2017 | Cilfone et al. |
| 10,021,669 B2 | 7/2018 | George |
| 10,163,105 B1 | 12/2018 | Ziraknejad et al. |
| 10,169,571 B1 | 1/2019 | Attfield et al. |
| 10,395,039 B2 | 8/2019 | Khatri et al. |
| 10,630,489 B2 | 4/2020 | Hughes |
| 10,678,555 B2 | 6/2020 | Johansson et al. |
| 10,841,295 B1 | 11/2020 | Pecen et al. |
| 11,563,565 B2 | 1/2023 | Yang et al. |
| 11,704,384 B2 | 7/2023 | Murphy et al. |
| 11,909,575 B1 | 2/2024 | Mehrotra |
| 2003/0046394 A1 | 3/2003 | Goddard |
| 2003/0131262 A1 | 7/2003 | Goddard |
| 2004/0246893 A1 | 12/2004 | Ahrens, Jr. |
| 2013/0339302 A1* | 12/2013 | Zhang ................ G06F 16/275 707/649 |
| 2013/0339303 A1* | 12/2013 | Potter ................ G06F 3/0683 707/649 |
| 2014/0317364 A1* | 10/2014 | Shepherd ............ H04L 67/1095 711/162 |
| 2015/0067217 A1 | 3/2015 | Feehrer |
| 2015/0301880 A1* | 10/2015 | Allu .................... G06F 11/0709 714/4.3 |
| 2017/0139411 A1 | 5/2017 | Hartung |
| 2017/0242605 A1* | 8/2017 | Suryanarayana ....... G06F 21/84 |
| 2017/0277876 A1 | 9/2017 | Alameh et al. |
| 2017/0289197 A1 | 10/2017 | Mandyam et al. |
| 2018/0006829 A1 | 1/2018 | Kravitz et al. |
| 2018/0157525 A1 | 6/2018 | Song |
| 2018/0321719 A1 | 11/2018 | Munjal |
| 2019/0042372 A1* | 2/2019 | Kumar ................ G06F 11/1464 |
| 2019/0156019 A1 | 5/2019 | Chen |
| 2020/0371859 A1* | 11/2020 | Sayyed .................... G06F 8/65 |
| 2021/0208963 A1 | 7/2021 | Ponnappan |
| 2021/0240567 A1* | 8/2021 | Hsu .................... G06F 13/4282 |
| 2021/0263868 A1 | 8/2021 | Maddukuri |
| 2022/0179702 A1 | 6/2022 | Dawkins |
| 2022/0222328 A1 | 7/2022 | Talib et al. |
| 2023/0011379 A1 | 1/2023 | Thommana |
| 2024/0134756 A1* | 4/2024 | Tonry .................. G06F 11/1469 |
| 2025/0004897 A1 | 1/2025 | Fan |

* cited by examiner

MANAGING DATA BACKUP FOR DATA PROCESSING SYSTEMS USING OUT-OF-BAND METHODS

FIELD

Embodiments disclosed herein relate generally to managing data processing systems. More particularly, embodiments disclosed herein relate to systems and methods for managing data backup for data processing systems using out-of-band methods.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
FIG. 1A shows a block diagram illustrating a distributed system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing data stored by a data processing system. The data processing system may access and/or use the data in order to provide computer-implemented services. For example, the data processing system may rely on access to the data to provide secure, reliable, and/or high-quality computer-implemented services. Therefore, if the data is lost (e.g., deleted, corrupted, etc.) and/or otherwise inaccessible to the data processing system, then the data processing system may be unable to continue provide the (expected and/or desired) computer-implemented services.

Thus, to increase the likelihood of providing the computer-implemented services, the data stored by the data processing system may be backed up (e.g., copied and placed in a restorable state). The data may be backed up periodically over time, as the data stored by the data processing system may be modified and/or new data may be stored by the data processing system. To do so, data backups (e.g., copies of portions of the data) may be generated by the data processing system and may be stored in a secure location where the data may be later accessed. For example, the data may be restored from its storage location in order to restore the data processing system to its previous operation after a system failure.

However, to generate the backups, the data processing system may rely on secure operation of its in-band components, such as hardware resources of the data processing system and/or software hosted by the hardware resources. Therefore, in circumstances where the in-band components are unable to securely generate the backups (e.g., due to failures of hardware and/or software, due to being compromised by a malicious party, due to the hardware resources being unpowered, etc.), the backups may not be (securely) generated. As a result, portions of the data may be leaked, lost (e.g., previous backups may not be up to date) and/or the lost data may be unrecoverable (e.g., re-creation of the lost data may be unfeasible or impractical).

Thus, to increase the likelihood of the data stored by the data processing system being securely placed in a restorable state, data backups for the data processing system may be managed out-of-band. For example, the data processing system may include out-of-band components that may operate (e.g., be powered) independently from the in-band components. The out-of-band components may be tasked with managing backup processes for the data processing system. To manage the backup processes, the out-of-band components may communicate with other devices (e.g., remote data storage systems) via out-of-band communication channels, circumventing potentially compromised (e.g., unsecure) and/or inoperable in-band components and in-band communication channels of the data processing system.

For example, the data processing system may include out-of-band components, such as a management controller. The management controller may, for example, identify backup events, initiate backup processes, obtain backup copies of the data, and/or provide the backup copies to a remote storage system via out-of-band communication channels.

By doing so, embodiments disclosed herein may provide a system for managing data stored by a data processing system in a manner that is more likely to place the data in a restorable state. When the data is in the restorable state, the data processing system may be more likely to continue to provide the (expected and/or desired) computer-implemented services over time.

In an embodiment, a computer-implemented method for managing data stored by a data processing system is provided. The method may include: identifying, by a management controller of the data processing system, an occurrence of a backup event for the data stored in hardware resources of the data processing system, the occurrence indicating that a portion of the data is to be backed up to a storage system that is remote to the data processing system; initiating, by the management controller and responsive to the occurrence, a backup process to obtain a backup data package for the data processing system based, at least in part, on the data; and, providing, by the management controller and via an out-of-band communication channel between the management controller and the storage system, the backup data package to the storage system to facilitate completion of the backup process, the completion of the backup process placing the data in a restorable state to enable continued provisioning of computer-implemented services by the data processing system.

The backup event may include a failure of a management entity hosted by the hardware resources. The backup data package may include diagnostic data usable to attempt to identify a root cause of the failure of the management entity, and the management entity is an operating system.

The backup event may include a reception, by the management controller and from the storage system, of a backup generation data package that indicates that a full backup of the data is to be generated and stored in the storage system. The backup data package may include an image of the data of the data processing system. During the backup event, a management entity tasked with managing operation of the hardware resources may be inoperable.

The backup event may include a reception, by the management controller and from the storage system, of a backup generation data package that indicates that an incremental backup of the data is to be generated and stored in the storage system. The backup data package may include at least one change made to the data after a last backup of the data was generated. During the backup event, a management entity tasked with managing operation of the hardware resources may be operable.

The backup event may include an identification, by the management controller, that a backup policy obtained via the out-of-band communication channel has been triggered.

The data processing system may include a network module adapted to separately advertise network endpoints for the management controller and the hardware resources, the network endpoints being usable by the storage system to address communications to the hardware resources and the management controller.

The management controller and the network module may be on separate power domains from the hardware resources so that the management controller and the network module are operable while the hardware resources are inoperable. The backup data package may be provided to the storage system while a portion of the hardware resources are inoperable due to being unpowered.

The out-of-band communication channel may run through the network module, and an in-band communication channel that services the hardware resources may also run through the network module.

A non-transitory media may include instructions that when executed by a processor cause the computer-implemented method to be performed.

The data processing system may include the non-transitory media and a processor, and may perform the computer-implemented method when the computer instructions are executed by the processor.

Turning to FIG. 1A, a block diagram illustrating a distributed system in accordance with an embodiment is shown. The system shown in FIG. 1A may provide for management of computing devices that may provide, at least in part, computer-implemented services. The computer-implemented services may include, for example, database services, data processing services, electronic communication services, and/or any other services that may be provided using one or more computing devices. Other types of computer-implemented services may be provided by the system shown in FIG. 1A without departing from embodiments disclosed herein.

The computer-implemented services may be provided by one or more components shown in the system of FIG. 1A. For example, the computer-implemented services may be provided, in part, by data processing system 102. Data processing system 102 may include any number of computing devices that may each include any number of hardware components (e.g., hardware resources such as processors, memory modules, storage devices, communications devices). The hardware components may support execution of any number and types of software components (e.g., applications, management entities, etc.), and, in some combination, these components may provide for various types of computer-implemented services.

To provide the computer-implemented services, data processing system 102 (e.g., hardware resources of data processing system 102) may store and/or access (stored) data. For example, the data may include user data, software, configuration data, sensitive data, and/or any other type of data that may be stored by computing devices. The data may, for example, define the operation of the hardware resources and/or may enable data processing system 102 to provide desired computer-implemented services (e.g., services that are secure, reliable, expected by consumers of computer-implemented services, etc.).

However, due to various reasons, data stored by a data processing system may be lost and/or may become inaccessible to the data processing system. For example, one or more hardware and/or software components of the data processing system may fail, the data processing system may be physically lost (e.g., stolen), the data may become corrupted, etc., which may negatively affect the operation of the data processing system and/or its provided computer-implemented services. Therefore, to protect the data from loss and/or to provide for the ability to restore the data to the data processing system (e.g., to restore desired operation of the data processing system), the data may be managed according to a backup policy.

For example, the backup policy may define frequencies of backups and/or backup operations for data stored by data processing system 102. The backup policy may, for example, define circumstances and/or actions for placing the data in a restorable state, such as storing a copy of the data in a storage system. Thus, if the data stored by data processing system 102 is lost and/or becomes inaccessible to data processing system 102, then the stored copy of the data may be restored to data processing system 102, and data processing system may resume providing desired computer-implemented services.

However, compliance with the backup policy may rely on operation of hardware resources of data processing system 102 (e.g., in-band components of data processing system 102). For example, if the in-band components become inoperable (e.g., the hardware resources are powered off, a management entity tasked with managing operation of the hardware resources fails, etc.), then the hardware resources may be unable to perform the backup operations defined by the backup policy and the data may not be placed in a restorable state. Therefore, relying on in-band methods for data management (e.g., data backup) may increase the risk of data loss and may cause indefinite interruptions to the provision of computer-implemented services.

In general, embodiments disclosed herein may provide methods, systems, and/or devices for managing data stored by a data processing system using out-of-band methods. To do so, the data processing system may include out-of-band components that may operate independently from the in-band components of the data processing system. The out-of-band components, along with other out-of-band devices, may manage backup operations according to backup policies, thereby removing any reliance on potentially unavailable (e.g., inoperable) in-band components. By doing so, the data may be more likely to be backed up (e.g., placed in a restorable state), the backed-up data may be more likely to be up to date, and, in cases where recovery of the (backed-up) data is warranted, the data processing system may be more likely to provide the desired computer-implemented services.

To perform the above-mentioned functionality, the system of FIG. 1A may include data processing system 102, and/or storage system 104. Data processing system 102, storage system 104, and/or any other type of devices not shown in FIG. 1A may perform all, or a portion of the computer-implemented services independently and/or cooperatively. These components are discussed below.

Data processing system 102 may include any number and/or type of data processing systems. Data processing system 102 may manage its data (e.g., data stored on hardware resources of data processing system 102), for example, by participating in backup operations for the data.

To perform its functionality, data processing system 102 may include out-of-band components, such as a management controller, and functionality that may allow the out-of-band components to communicate with other devices separately from in-band components and without traversing in-band communication channels of data processing system 102. For example, data processing system 102 may include functionality that allows the management controller to communicate with storage system 104 through out-of-band communication channels while performing backup operations. For more information regarding components of data processing system 102, refer to the discussion of FIG. 1B.

Prior to participating in backup operations, data processing system 102 may undergo a provisioning process, where provisioning data (e.g., configuration data, software, user data, policies, etc.) is provided to data processing system 102. The provisioning data may be obtained by data processing system 102 (e.g., the management controller) through an out-of-band communication channel from a remote provisioning server (not shown). The provisioning data may include a backup policy for data processing system 102. The backup policy may, for example, define backup operations for data processing system 102.

For example, backup operations performed by the management controller may include (i) identifying occurrences of backup events for data stored by data processing system 102, and based on the occurrences of the events, (ii) performing, at least in part, backup processes in order to obtain backup data packages, (iii) providing the backup data packages to other devices (e.g., storage system 104) via out-of-band communication channels, and/or (iv) performing other actions relating to enforcing the backup policy for data processing system 102.

Different types of backup events may trigger the management controller to perform different types of backup processes. For example, depending on the backup event (and the backup policy for data processing system 102), the management controller may perform a full backup for data stored by data processing system 102, or an incremental backup for data stored by data processing system 102. The data targeted for backup may be based on the event and/or the backup policy for data processing system 102. For example, the targeted data may include diagnostic data for data processing system 102, an image of (the data stored by) data processing system 102, and/or portions of the data (e.g., a change to a block or a byte of data) stored by data processing system 102. Refer to the discussion of FIGS. 2A-2B for examples of managing data backup for data processing systems.

Storage system 104 may include any number and/or type of systems that may provide computer-implemented services such as data backup services. Storage system 104 may be implemented using physical devices that provide data storage and/or management services (e.g., obtaining data, storing data, providing copies of previously stored data, etc.). The devices that provide data storage services may include hardware devices and/or logical devices. For example, storage system 104 may include any quantity and/or combination of memory devices (i.e., volatile storage), long term storage devices (i.e., persistent storage) and/or other types of devices that may provide short-term and/or long-term data storage services.

To provide data backup services, storage system 104 may, for example, (i) initiate backup processes for data processing system 102 (e.g., by communicating with the management controller via out-of-band communication channels), (ii) obtain backup data packages (e.g., from the management controller), and/or (iii) perform storage processes based on the backup data packages, and/or (iv) perform other actions relating to data backup services (e.g., provide and/or manage access for retrieval of stored data by data processing system 102 and/or other devices).

Thus, data stored by data processing system 102 may be managed (e.g., backed up) using out-of-band methods (e.g., using out-of-band components and via out-of-band communication channels). By doing so, backups of the data may be generated regardless of the operation of in-band components (and software hosted by in-band components) of data processing system 102, increasing the likelihood of the data being up to date and/or being placed in a restorable state.

Figure 2A:
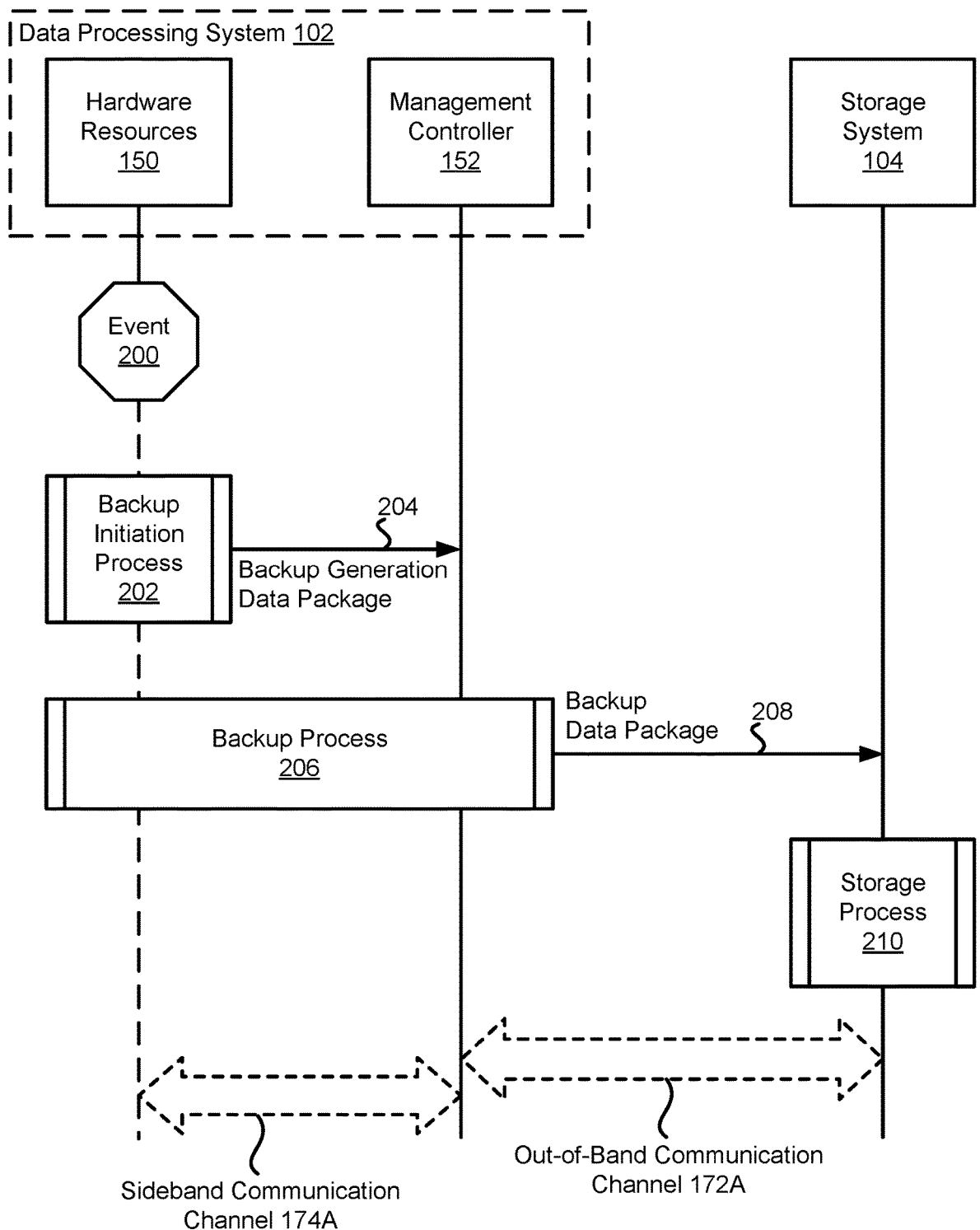
FIGS. 2A-2B show interaction diagrams in accordance with an embodiment.
Figure 2B:
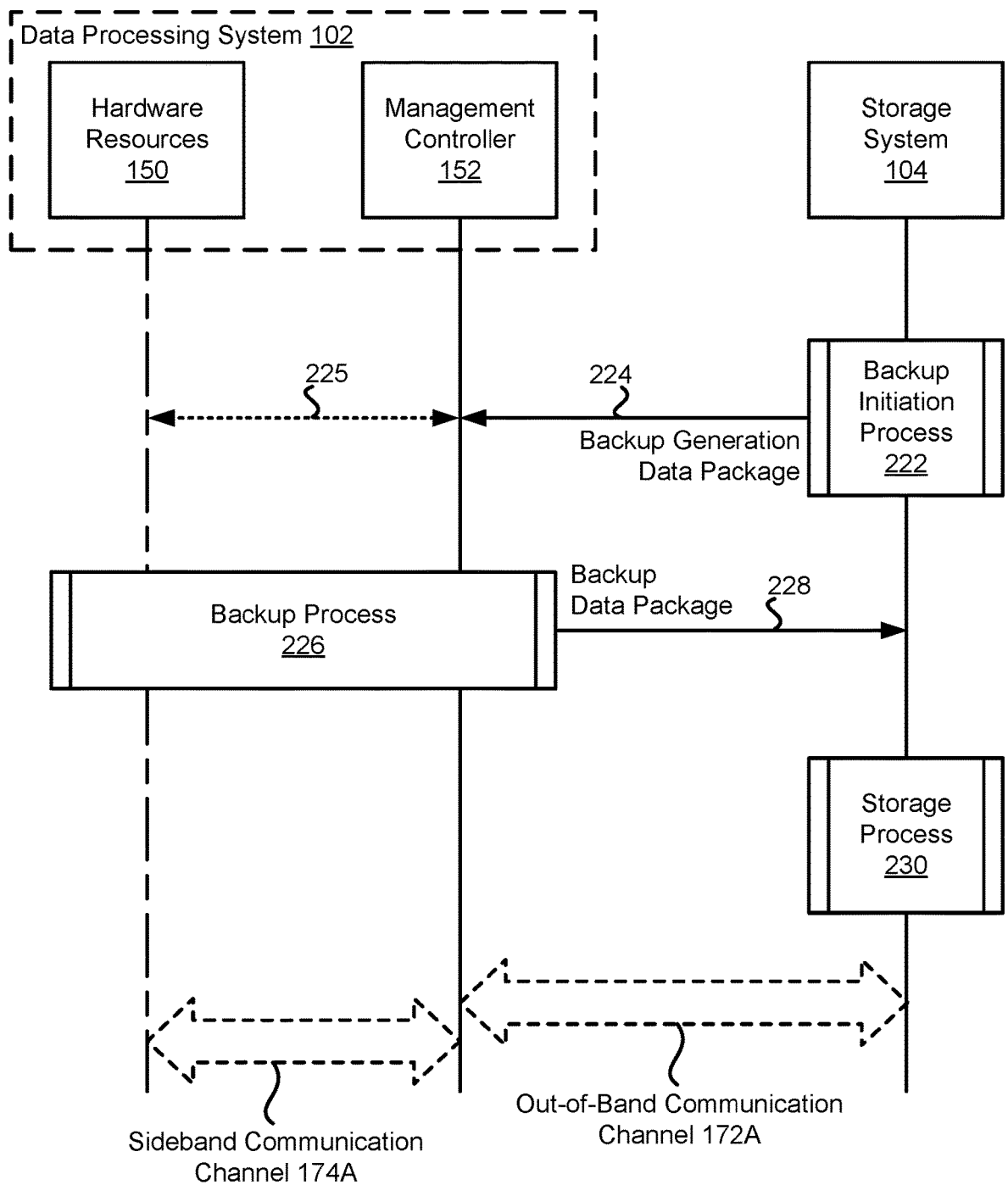
Figure 3:
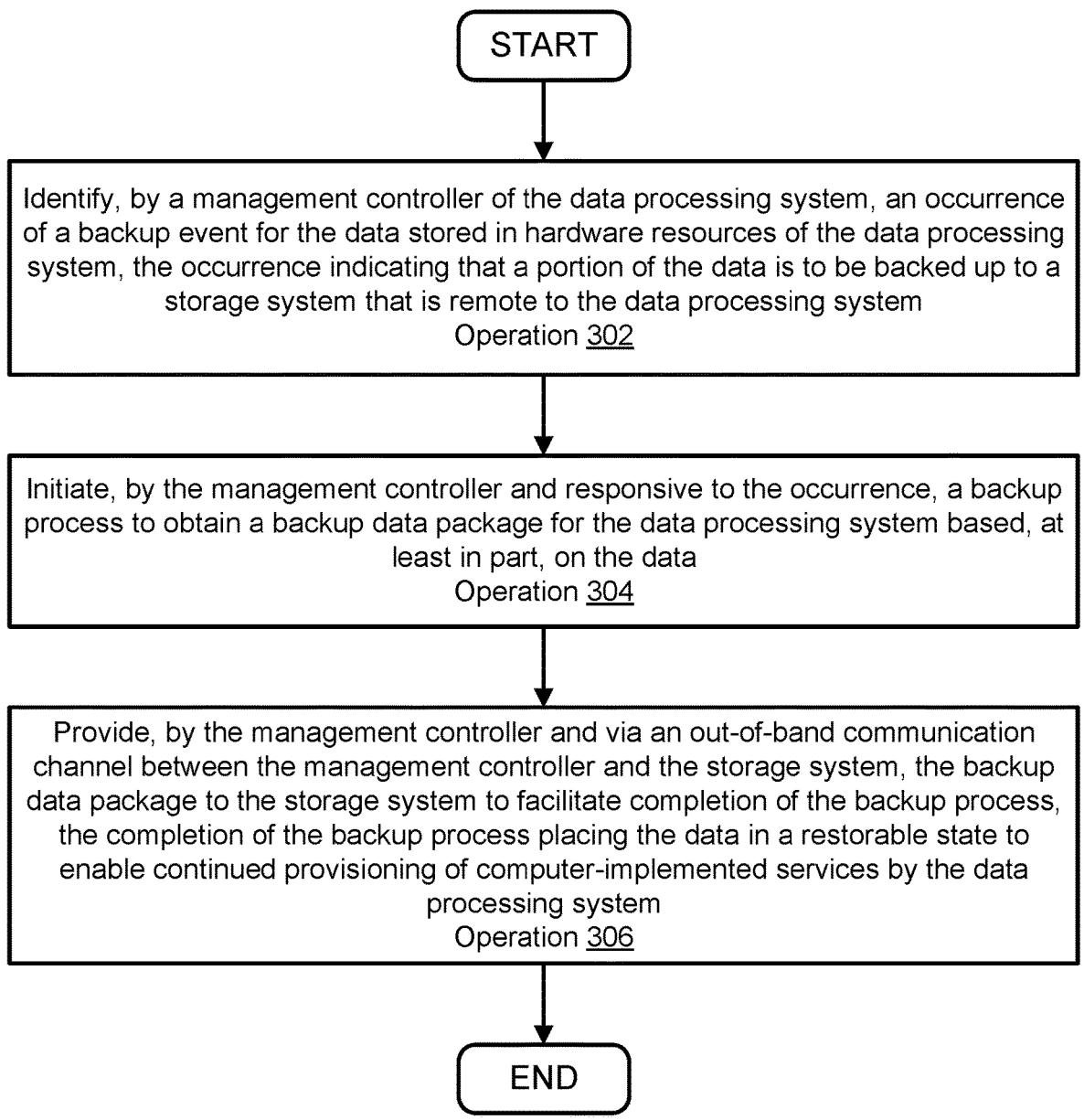
FIG. 3 shows a flow diagram illustrating a method in accordance with an embodiment.

When providing their functionality, any of data processing system 102 and/or storage system 104 may perform all, or a portion of the processes, interactions, and/or methods shown in FIGS. 2A-3.

Any of (and/or components thereof) data processing system 102 and/or storage system 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., smartphone), an embedded system, local controllers, an edge node, and/or any other type of data processing device or system. For additional details regarding computing devices, refer to the discussion of FIG. 4.

In an embodiment, one or more of data processing system 102 and/or storage system 104 are implemented using an internet of things (IoT) device, which may include a computing device. The IoT device may operate in accordance with a communication model and/or management model known to data processing system 102, storage system 104, and/or other devices.

Any of the components illustrated in FIG. 1A may be operably connected to each other (and/or components not illustrated) with communication system 106. In an embodiment, communication system 106 includes one or more networks that facilitate communication between any number of components. The networks may include wired networks and/or wireless networks (e.g., and/or the Internet). The networks may operate in accordance with any number and/or types of communication protocols (e.g., such as the internet protocol).

While illustrated in FIG. 1A as including a limited number of specific components, a system in accordance with an embodiment may include fewer, additional, and/or different components than those illustrated therein. For example, while the system of FIG. 1A shows a single data processing system (e.g., 102), it will be appreciated that the system may include any number of data processing systems.

Figure 1B:
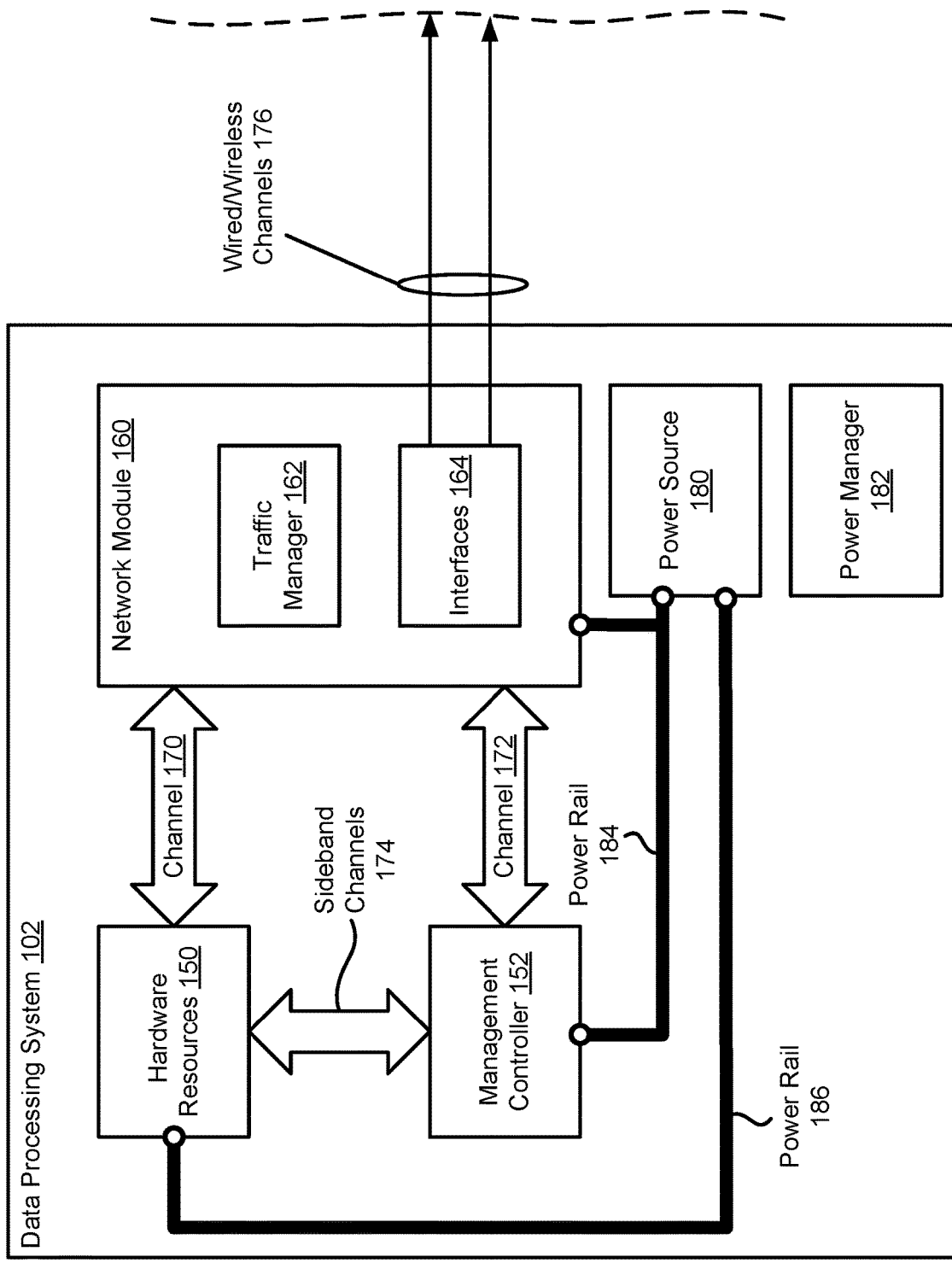
FIG. 1B shows a block diagram illustrating a data processing system in accordance with an embodiment.

Turning to FIG. 1B, a diagram illustrating a data processing system in accordance with an embodiment is shown. The data processing system (e.g., data processing system 102) shown in FIG. 1B may be similar to any of the computing devices (e.g., data processing system 102) shown in FIG. 1A.

To provide computer-implemented services, data processing system 102 may include any quantity of hardware resources 150. Hardware resources 150 may be in-band hardware components, and may include a processor operably coupled to memory, storage, and/or other hardware components.

The processor may host various management entities such as operating systems, drivers, network stacks, and/or other software entities that provide various management functionalities. For example, the operating system and drivers may provide abstracted access to various hardware resources. Likewise, the network stack may facilitate packaging, transmission, routing, and/or other functions with respect to exchanging data with other devices.

For example, the network stack may support transmission control protocol/internet protocol communication (TCP/IP) (e.g., the Internet protocol suite) thereby allowing the hardware resources 150 to communicate with other devices via packet switched networks and/or other types of communication networks.

The processor may also host various applications that provide the computer-implemented services. The applications may utilize various services provided by the management entities and use (at least indirectly) the network stack to communicate with other entities.

However, use of the network stack and the services provided by the management entities may place the applications at risk of indirect compromise. For example, if any of these entities trusted by the applications are compromised, then these entities may subsequently compromise the operation of the applications. For example, if various drivers and/or the communication stack are compromised, then communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 102) to another device via any number of intermediate networks (e.g., via wired/wireless channels 176 that are part of the networks).

To reduce the likelihood of the applications and/or other in-band entities from being indirectly compromised, data processing system 102 may include management controller 152 and network module 160. Each of these components of data processing system 102 is discussed below.

Management controller 152 may be implemented, for example, using a system on a chip or other type of independently operating computing device (e.g., independent from the in-band components, such as hardware resources 150 of a host data processing system 102). Management controller 152 may provide various management functionalities for data processing system 102. For example, management controller 152 may monitor various ongoing processes performed by the in-band components, may manage power distribution, thermal management, and/or may perform other functions for managing data processing system 102 (e.g., managing backup of data stored by data processing system 102).

To do so, management controller 152 may be operably connected to various components via sideband channels 174 (in FIG. 1B, a limited number of sideband channels are included for illustrative purposes, it will be appreciated that management controller 152 may communicate with other components via any number of sideband channels). The sideband channels may be implemented using separate physical channels, and/or with a logical channel overlay over existing physical channels (e.g., logical division of in-band channels). The sideband channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, to reduce the likelihood of indirect compromise of an application hosted by hardware resources 150, management controller 152 may enable information from other devices to be provided to the application without traversing the network stack and/or management entities of hardware resources 150. To do so, the other devices may direct communications including the information to management controller 152.

Management controller 152 may then, for example, send the information via sideband channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similarly, processes may be used to facilitate outbound communications from the applications.

Management controller 152 may be operably connected to communication components of data processing system 102 via separate channels (e.g., 172) from the in-band components, and may implement or otherwise utilize a distinct and independent network stack (e.g., TCP/IP). Consequently, management controller 152 may communicate with other devices independently of any of the in-band components (e.g., does not rely on any hosted software, hardware components, etc.). Accordingly, compromise of any of hardware resources 150 and hosted components may not result in indirect compromise of any management controller 152, and entities hosted by management controller 152.

For example, if hardware resources 150 (or any hosted components) are compromised as part of an attack by a malicious party, then management controller 152 may perform backup operations surreptitiously and/or independently from hardware resources 150 (e.g., which may be under the control of the malicious party).

To facilitate communication with other devices, data processing system 102 may include network module 160. Network module 160 may provide communication services for in-band components and out-of-band components (e.g., management controller 152) of data processing system 102. To do so, network module 160 may include traffic manager 162, and interfaces 164.

Traffic manager 162 may include functionality to (i) discriminate traffic directed to various network endpoints advertised by data processing system 102, and (ii) forward the traffic to/from the entities associated with the different network endpoints. For example, to facilitate communications with other devices, network module 160 may advertise different network endpoints (e.g., different media access control address/internet protocol addresses) for the in-band components and out-of-band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in-band components. Likewise, outbound traffic from the out-of-band component may never flow through the in-band components.

Therefore, backup operations may be performed even when a management entity of data processing system 102 (e.g., tasked with managing operation of hardware resources 150) is inoperable or compromised. For example, management controller 152 may provide backup data packages to a remote server (e.g., storage system 104) for storage via an out-of-band communication channel established between the remote server and management controller 152, independently from the management entity and/or hardware resources 150

To support inbound and outbound traffic, network module 160 may include any number of interfaces 164. Interfaces 164 may be implemented using any number and type of communication devices which may each provide wired and/or wireless communication functionality. For example, interfaces 164 may include a wireless wide area network (WWAN) card, a Wi-Fi card, a wireless local area network card, a wired local area network card, an optical communication card, and/or other types of communication components. These component may support any number of wired/wireless channels 176.

Thus, from the perspective of an external device, the in-band components and out-of-band components of data processing system 102 may appear to be two independent network entities that may be independently addressable and/or otherwise unrelated to one another.

To facilitate management of data processing system 102 over time, hardware resources 150, management controller 152 and/or network module 160 may be positioned in separately controllable power domains. By being positioned in these separate power domains, different subsets of these components may remain powered while other subsets are unpowered.

For example, management controller 152 and network module 160 may remain powered while hardware resources 150 is unpowered. Consequently, management controller 152 may remain able to communicate with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons. Therefore, if a portion of hardware resources 150 are inoperable due to being unpowered, then backup operations may still be performed. For example, management controller 152 may provide backup data packages to a remote storage system (e.g., 104) while the portion of hardware resources 150 are unpowered.

To implement the separate power domains, data processing system 102 may include a power source (e.g., 180) that separately supplies power to power rails (e.g., power rail 184, power rail 186) that power the respective power domains. Power from the power source (e.g., a power supply, battery, etc.) may be selectively provided to the separate power rails to selectively power the different power domains. A power manager (e.g., 182) that may manage power from power source 180 may be supplied to the power rails. Management controller 152 may cooperate with power manager 182 to manage supply of power to these power domains.

In FIG. 1B, an example implementation of separate power domains using power rails 184-186 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

To further clarify embodiments disclosed herein, an interaction diagram in accordance with an embodiment is shown in each of FIGS. 2A-2B. The interaction diagrams may illustrate examples of how data may be obtained and used within the systems of FIGS. 1A-1B.

In the interaction diagrams, processes performed by and interactions between components of a system in accordance with an embodiment are shown. In the diagrams, components of the system are illustrated using a first set of shapes (e.g., 150, 152, etc.), located towards the top of each figure. Lines descend from these shapes. Some of the lines descending from some of the first set of shapes (e.g., 150) are drawn in dashing to indicate, for example, that the corresponding components may not be (i) operable, (ii) powered on, (iii) present in the system, and/or (iv) not participating in operation of the system for other reasons. Processes performed by the components of the system are illustrated using a second set of shapes (e.g., 202, 206 etc.) superimposed over these lines.

Interactions (e.g., communication, data transmissions, etc.) between the components of the system are illustrated using a third set of shapes (e.g., 204, 208, etc.) that extend between the lines. The third set of shapes may include lines terminating in one or two arrows. Lines terminating in a single arrow may indicate that one-way interactions (e.g., data transmission from a first component to a second component) occur, while lines terminating in two arrows may indicate that multi-way interactions (e.g., data transmission between two components) occur. Lines terminating in one or two arrows that are drawn in dashing (e.g., 225) may indicate, for example, that the corresponding interaction(s) (i) may be optional, and/or (ii) may occur depending on the outcome of the processes and/or other interactions occurring in the diagram (or for other reasons).

Generally, the processes and interactions are temporally ordered in an example order, with time increasing from the top to the bottom of each page. For example, the interaction labeled as 204 may occur prior to the interaction labeled as 208. However, it will be appreciated that the processes and interactions may be performed in different orders, any may be omitted, and other processes or interactions may be performed without departing from embodiments disclosed herein.

The processes shown in FIGS. 2A-2B may be performed by any entity shown in the systems of FIGS. 1A-1B (e.g., a device similar to one of data processing system 102, a system similar to storage system 104, etc.) and/or another entity without departing from embodiments disclosed herein.

FIGS. 2A-2B show interaction diagrams that illustrate processes and interactions that may occur when managing data stored by a data processing system. As discussed with respect to FIGS. 1A-1B, the data processing system may include in-band components and out-of-band components. For example, data processing system 102 may include hardware resources 150 and management controller 152.

Turning to FIG. 2A, a first interaction diagram in accordance with an embodiment is shown. The first interaction diagram may illustrate a backup of diagnostic data stored by data processing system 102. In the example shown in the first interaction diagram, a management entity managing the operation of hardware resources 150 may be operable (as indicated by the solid line descending from hardware resources 150). The management entity may include an operating system of data processing system 102 and may remain operable until the occurrence of event 200.

Event 200 may include a fatal system error encountered by the management entity, and the fatal system error may cause the management entity to fail (as indicated by the dashed line descending from event 200). For example, event 200 may occur as a result of issues with hardware resources 150 (e.g., hardware failures, driver issues, etc.), unexpected terminations of crucial processes, and/or any other conditions where data processing system 102 may not operate safely. During event 200, a basic input/output system (BIOS) of data processing system 102 may take over management of the operation of hardware resources 150. For example, upon encountering event 200, the BIOS may instruct a display device operably connected to data processing system 102 to display a critical error screen, such as a Blue Screen of Death (e.g., BSoD).

The occurrence of event 200 may trigger the backup policy for data processing system 102, prompting the BIOS to perform backup initiation process 202. During backup initiation process 202, information regarding event 200 may be identified. For example, the BIOS may identify diagnostic data usable to attempt to identify a root cause of the failure of the management entity. The diagnostic data may include, for example, error dump files (e.g., a BSoD dump file), log data (e.g., indicating activity of and/or a state of all components of data processing system 102 around the time of event 200), and/or any other data usable to perform root cause analysis for event 200.

Backup initiation process 202 may include obtaining (e.g., generating) a backup generation data package. The backup generation data package may include (i) information usable to identify and/or authenticate hardware resources 150, (ii) the type of backup that is to be performed (e.g., a backup of diagnostic data), (iii) information regarding the diagnostic data (e.g., identifiers for the data, file locations, file sizes, etc.), and/or (iv) other information usable to request a backup of the diagnostic data.

At interaction 204, the backup generation data package may be provided to management controller 152 by hardware resources 150. For example, hardware resources 150 may provide the backup generation data package to management controller 152 via sideband communication channel 174A through (i) transmission via a message, (ii) storing in a storage with subsequent retrieval by management controller 152, (iii) a publish-subscribe system where management controller 152 subscribes to updates from hardware resources 150 thereby causing a copy of the backup generation data package to be propagated to management controller 152, and/or (iv) other processes. By providing the backup generation data package to management controller 152, management controller 152 may perform backup operations.

Upon obtaining the backup generation data package, management controller 152 may identify an occurrence of a backup event. The backup event may include event 200, reception of the backup generation data package (e.g., from hardware resources 150), and/or other types of events. Upon obtaining the backup generation data package from hardware resources 150, management controller 152 may identify the occurrence of event 200 (e.g., the failure of the management entity).

While described with respect to other entities identifying the occurrence of the events triggering backup generation, management controller 152 may identify the occurrence of event 200 directly (e.g., without and/or before obtaining the backup generation data package). For example, management controller 152 may monitor hardware resources 150 for activity indicating that the fatal error has occurred. The activity may, for example, trigger the backup policy for data processing system 102.

The occurrence of the backup event and/or information included in the backup generation data package may indicate that the diagnostic data is to be backed up (e.g., to a remote storage system, storage system 104). Therefore, based on the identification of the occurrence of the backup event, management controller 152 may perform backup operations, which may include initiating a backup process for the diagnostic data.

Backup process 206 may include performing actions (e.g., backup operations) in order to enforce the backup policy for data processing system 102. To do so, management controller 152 may perform one or more backup operations directly or in conjunction with a portion of hardware resources 150 (via communication through sideband communication channel 174A). Backup process 206 may be performed while a portion of hardware resources 150 is unpowered. For example, management controller 152 may instruct a power manager (e.g., 182) to provide power to a sub portion of the portion of hardware resources 150 in order to perform one or more of the backup operations.

Backup process 206 may include (i) identifying the diagnostic data (e.g., based on information included in the backup generation data package), (ii) generating a copy of the diagnostic data, (iii) generating new data based on the diagnostic data, and/or (iv) other actions and/or processes (e.g., compression processes, encryption processes, etc.). During backup process 206, the management controller may obtain (e.g., generate) a backup data package based on the data stored by data processing system 102. For example, the backup data package may include (i) the data targeted for backup (e.g., the diagnostic data, the new data), and/or (iii) other information (e.g., identifiers for data processing system 102, storage instructions, authentication information, etc.).

At interaction 208, the backup data package may be provided to storage system 104 by management controller 152. For example, management controller 152 may provide the backup data package to storage system 104 via out-of-band communication channel 172A through (i) transmission via a message, (ii) storing in a storage with subsequent retrieval by storage system 104, (iii) a publish-subscribe system where storage system 104 subscribes to updates from management controller 152 thereby causing a copy of the backup data package to be propagated to storage system 104, and/or (iv) other processes. By providing the backup data package to storage system 104, storage system 104 may provide data backup services.

To provide the data backup services, storage system 104 may obtain the backup data package and/or perform an authentication process to verify that the backup data package is authentic. Based on the authenticity of the backup data package, storage system 104 may perform storage process 210.

During storage process 210, storage system 104 may identify a storage location for data included in the backup data package based on information included in the backup data package. Storage system 104 may store the data in the storage location, placing the data in a restorable state. The data stored by storage system 104 may be stored securely and/or in a compressed format. For example, the data may be encrypted and/or may only be accessible by users with an appropriate level of permissions. Storage process 210 may include updating a database managing the storage of backup data for data processing system 102 in order to reflect newly stored data. Once the data is placed in the restorable state, the data may be recovered (e.g., accessed) by data processing system 102 and/or other devices.

For example, the diagnostic data may be accessed and/or analyzed by an administrator or other service personnel in order to attempt to identify a root cause of the failure of operating system of data processing system 102 (e.g., event 200). By backing up the diagnostic data to storage system 104, the diagnostic data may be accessed without relying on physical access to data processing system 102, the operation of hardware resources 150, and/or the operation of the management entity hosted by hardware resources 150.

Thus, as shown in the example of FIG. 2A, diagnostic data stored by a data processing system may be backed up using out-of-band methods despite a failure of its operating system. The diagnostic data may be provided to a remote storage system by out-of-band components and out-of-band communication channels, regardless of the failed operating system. By doing so, the diagnostic data may be more likely to be made available to other devices via the remote storage system, where it may be used (e.g., by administrators of the data processing system) to improve the reliability of the operation of and/or the computer-implemented services provided by the data processing system.

Turning to FIG. 2B, a second interaction diagram in accordance with an embodiment is shown. The second interaction diagram may illustrate different types of backups for data stored by data processing system 102. The type of data backup may be determined based on a state of data processing system 102. For example, a management entity, such as an operating system, may be tasked with managing operation of hardware resources 150. The state of data processing system 102 may be based on the operation of hardware resources 150, and therefore the operation of the management entity. For example, the management entity may be operable (e.g., powered and operating normally), or inoperable (e.g., unpowered or failed), as indicated by the two-dashed line descending from hardware resources 150.

To back up data stored by data processing system 102, storage system 104 may perform backup initiation process 222. Storage system 104 may be prompted to perform backup initiation process 222 manually (e.g., by a user). For example, a user (e.g., an administrator of data processing system 102) may use an application hosted by a device (e.g., a requesting device) to request a backup of data stored by data processing system 102 (e.g., a target device). The device may include, for example, a user device, a service device, or any other device that may be used to manage data processing system 102.

The request for backup may be obtained by storage system 104 (e.g., via the application, not shown). Storage system 104 may authenticate the requesting device (and the request for backup) before performing backup initiation process 222. Storage system 104 may perform backup initiation process 222 automatically (e.g., based on a backup schedule and/or according to the backup policy for data processing system 102).

Backup initiation process 202 may include obtaining (e.g., generating) a backup generation data package. The backup generation data package may include (i) information usable to identify and/or authenticate storage system 104, (ii) the type of backup that is to be performed (e.g., a full backup, an incremental backup), (iii) information regarding the data targeted for backup (e.g., file locations, file names, etc.), and/or (iv) other information usable to request the type of backup. For example, if the management entity is operable, then the backup generation data package may indicate an incremental backup of the data is to be performed. Or, for example, if the management entity is inoperable, then the backup generation package may indicate that a full backup of the data is to be performed.

During backup initiation process 222, storage system 104 may identify out-of-band components (e.g., management controller 152) of data processing system 102. For example, a device identifier for data processing system 102 may be associated with management controller 152 in a lookup database. Storage system 104 may query the database to obtain information regarding management controller 152, which may include information usable to establish secure communication channels with and/or address messages to management controller 152.

At interaction 224, the backup generation data package may be provided to management controller 152 by storage system 104. For example, storage system 104 may provide the backup generation data package to management controller 152 via out-of-band communication channel 172A through (i) transmission via a message, (ii) storing in a storage with subsequent retrieval by management controller 152, (iii) a publish-subscribe system where management controller 152 subscribes to updates from storage system 104 thereby causing a copy of the backup generation data package to be propagated to management controller 152, and/or (iv) other processes. By providing the backup generation data package to management controller 152, management controller 152 may perform backup operations.

Management controller 152 may authenticate storage system 104 and/or the backup generation data package. Once authenticated, management controller 152 may identify an occurrence of a backup event. The backup event may include, for example, (i) the reception of the backup generation data package by management controller 152 (e.g., from storage system 104), and/or (ii) an identification that the backup policy for data processing system 102 has been triggered.

Management controller 152 may identify that the backup policy has been triggered, for example, by identifying activity and/or processes performed by hardware resources 150. For example, the operation (or lack of operation) of hardware resources 150 may trigger certain types of backups (e.g., based on the backup policy). Identification of the backup event may cause management controller 152 to initiate backup process 226.

To enforce the backup policy, management controller 152 may initiate performance of backup process 226. Backup process 226 may be similar to backup process 206 of FIG. 2A. For example, backup process 226 may include obtaining (e.g., generating) a backup data package. The backup data package may be obtained based on the backup generation data package. For example, if the backup generation data package indicates that a full backup of the data stored by data processing system 102 is to be generated and stored in storage system 104, then the backup data package may include an image (of the data) of data processing system 102.

Or, for example, if the backup generation data package indicates that an incremental backup of the data is to be generated and stored in storage system 104, then the backup data package my include changes (e.g., at least one change) made to the data after a last backup of the data was generated. Obtaining the backup data package for the incremental backup may include, for example, identifying specific files and/or folders (e.g., critical files and/or changed files) to include in the backup data package. To identify changed files, for example, management controller 152 may read a portion of the data stored by data processing system 102 while hardware resources 150 are inoperable (e.g., while the management entity is inoperable).

The backup data package obtained by management controller 152 during backup process 226 may include (i) the data targeted for backup (e.g., the image of data processing system 102, the change(s) made to a portion of data stored by data processing system 102, (ii) newly generated data (e.g., derived from the data targeted for backup and/or other data stored by data processing system 102), and/or (iii) other information (e.g., identifiers for data processing system 102, storage instructions, authentication information, etc.).

At interaction 228, the backup data package may be provided to storage system 104 by management controller 152. For example, management controller 152 may provide the backup data package to storage system 104 through out-of-band communication channel 172A via methods similar to those discussed with respect to interaction 208 of FIG. 2A.

By providing the backup data package to storage system 104 via out-of-band communication channel 172A, the backup data package may be obtained by storage system 104 even while hardware resources 150 are unpowered (and/or the management entity of hardware resources 150 is inoperable). In addition, if hardware resources 150 and/or the management entity are compromised by a malicious party, then the backup data package may still be obtained from management controller 152 without risk of tampering or interception of the backup data package by the malicious party.

Upon obtaining the backup data package, storage system 104 may initiate and perform storage process 230, similar to the initiation and/or performance of storage process 210 of FIG. 2A. Once the data has been backed up according to the backup policy (e.g., stored securely by storage system 104), the data may be considered to be in a restorable state. While in the restorable state, the data may be recovered (e.g., out-of-band, from storage system 104).

For example, the image data for data processing system 102 stored by storage system 104 may be accessed and/or used to fully restore a data processing system (e.g., data processing system 102). Or, for example, incremental backup data (e.g., changes to portions of the data stored by data processing system 102) may be accessed and/or combined with previous incremental backups of the data to restore portions of the data stored by a data processing system, such as critical files (e.g., files that may be critical in enabling a data processing system to provide the desired computer-implemented services).

Thus, as shown in the example of FIG. 2B, backup processes for data stored by a data processing system may be managed (e.g., initiated and/or performed) out-of-band when in-band components may not be reliable to do so. Without relying on potentially unavailable and/or compromised in-band components of the data processing system, out-of-band components of the data processing system may identify and respond to backup events that may trigger enforcement of a backup policy for the data processing system. By doing so, backups of the data may be more likely to be performed (e.g., in a timely manner) in circumstances where the data processing system is compromised and/or inoperable, reducing the likelihood of data loss.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor-based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIGS. 1A-2B may perform various methods to back up data stored by data processing systems using out-of-band methods. By using out-of-band methods to manage data backup processes for the data, the data may be more likely to be placed in a restorable state. As a result, data processing systems that rely on recovery of the data may be more likely to provide the desired computer-implemented services.

Turning to FIG. 3, a flow diagram illustrating a method for managing a data processing system in accordance with an embodiment is shown. The method illustrated in FIG. 3 may be performed by the components of the system of FIGS. 1A-2B and/or may be performed by a data processing system and/or another device. In the diagram discussed below and shown in FIG. 3, any of the operations may be repeated, performed in different orders, and/or performed in parallel with or in a partially overlapping in time manner with other operations.

At operation 302, a management controller of the data processing system may identify an occurrence of a backup event for the data stored in hardware resources of the data processing system. The management controller may identify the occurrence of the backup event by methods discussed with respect to FIGS. 2A-2B (e.g., interactions 204, 224, 225). For example, the management controller may identify the occurrence by (i) snooping activity and/or processes of hardware resources of the data processing system (e.g., to identify a failure of a management entity hosted by the hardware resources), (ii) obtaining a backup generation data package (e.g., from a remote storage system, from the hardware resources, etc.), (iii) obtaining a message (e.g., generated and/or provided by a BIOS of the data processing system), and/or (iv) other methods.

Identifying the occurrence of the backup event may include identifying that a backup policy for the data processing system has been triggered. For example, the backup policy may be triggered based on (i) activity and/or processes of the hardware resources and/or the management entity, (ii) reception of data by the management controller (e.g., the backup generation data package, messages from the BIOS), (iii) based on a schedule, and/or (iv) other events that may trigger the backup policy (e.g., predicting that a failure of a component of the data processing system, based on checks for modifications to critical files, etc.). The occurrence may indicate that a portion of the data is to be backed up to a storage system that is remote to the data processing system.

At operation 304, in response to the occurrence of the backup event, the management controller may initiate a backup process to obtain a backup data package for the data processing system, based, at least in part, on the data. The management controller may initiate the backup process by (i) powering storage devices that include relevant data if depowered, (ii) issuing read commands to the storage devices to obtain data, and (iii) analyzing the read data to obtain the backup data package. The management controller may initiate the backup process by instructing another device (e.g., a storage controller), to generate the backup data package. The backup process may be initiated via other methods without departing from embodiments disclosed herein.

The backup process may include obtaining a backup data package. The backup data package may be obtained by (i) identifying data (e.g., the portion of the data that is to be backed up and/or other data stored by the data processing system), (ii) encapsulating the data in a data package (e.g., the backup data package), and/or (iii) by other methods (e.g., refer to FIGS. 2A-2B for more details regarding backup data packages and/or backup processes).

At operation 306, the management controller may provide, via an out-of-band communication channel (e.g., between the management controller and the storage system), the backup data package to the storage system to facilitate completion of the backup process. The storage system may include a remote storage system. The management controller may provide the backup data package to the storage system using methods similar to those described with respect to FIGS. 2A-2B (e.g., interactions 208, 228) and/or by other methods.

The data may be placed in a restorable state (e.g., the data may be stored by the storage system as part of a storage process) to enable continued provisioning of computer-implemented services by the data processing system. For example, the data may include all data stored by the data processing system (e.g., from a previously performed full back up and/or from previously performed incremental backups). The data may be used to restore the data processing system after the data processing system experiences a failure and/or may be used to set up a new data processing system to enable continued provisioning of computer-implemented services by the data processing system (and/or the new data processing system).

Or, for example, the data may include diagnostic data usable to troubleshoot errors and/or failures encountered by the data processing system (e.g., used to perform root cause analysis). The outcomes of the analysis and/or troubleshooting may be used to update operation of the data processing system so that the data processing system is less likely to encounter errors and/or failures in the future, and is more likely to continue providing (desired) computer-implemented services.

The method may end following operation 306.

As illustrated above, embodiments disclosed herein may provide systems and methods usable to manage data stored by a data processing system using out-of-band methods, without relying on in-band methods (which may be unreliable and/or unsecure). The data may be managed by out-of-band components of the data processing system according to a backup policy that governs backups of portions of the data automatically and/or in real-time. By managing data backups out-of-band, the data may be more likely to be backed up in a timely manner; reducing likelihood of data stored by the data processing systems becoming lost and/or compromised. Accordingly, the disclosed process provides for both an embodiment in computing technology and an improved method for managing the security of data stored by data processing systems.

Figure 4:
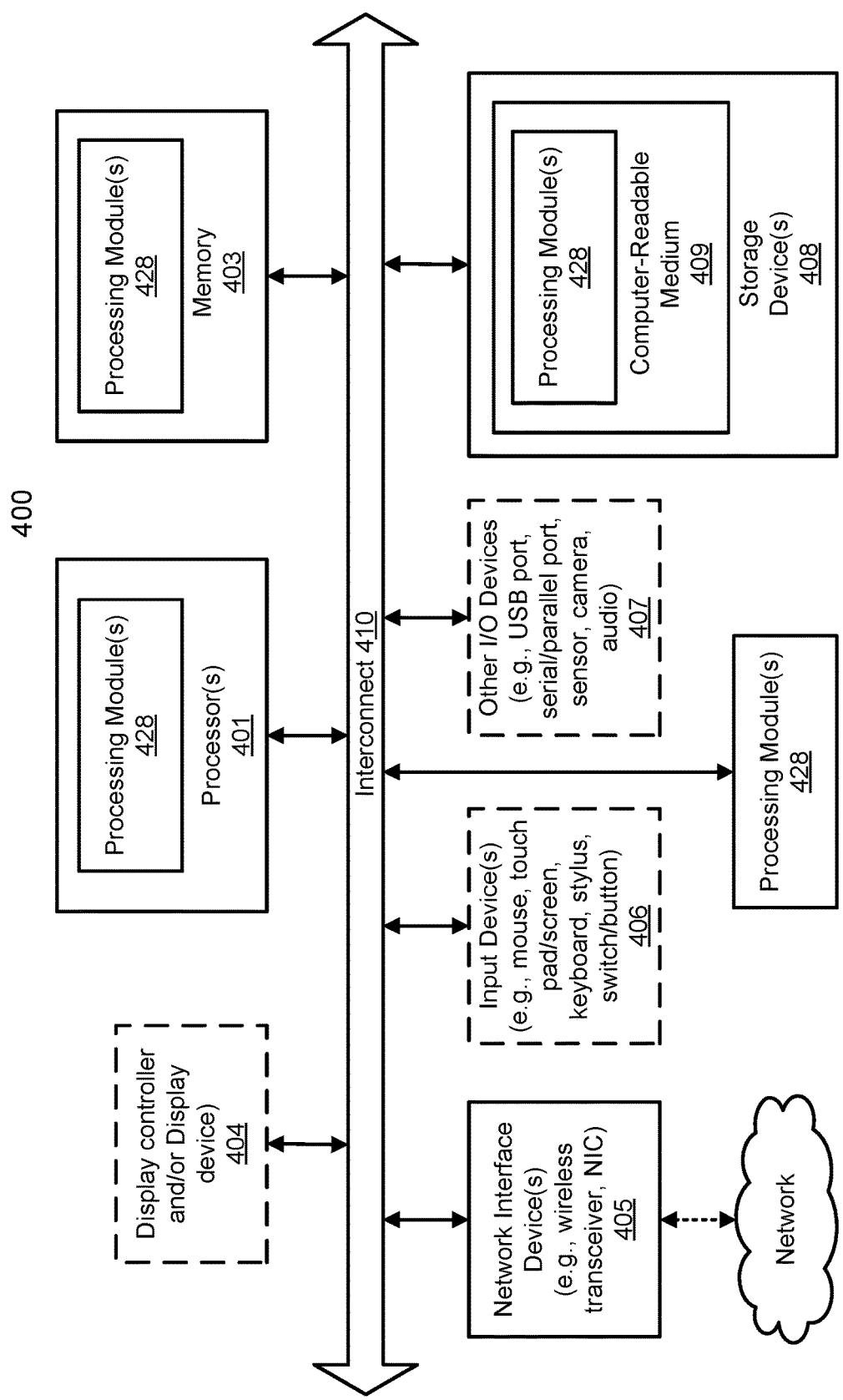
FIG. 4 shows a block diagram illustrating a data processing system in accordance with an embodiment.

Any of the components illustrated in FIGS. 1A-3 may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations.

System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-408 via a bus or an interconnect 410. Processor 401 may represent a single processor or multiple processors with a single processor core or multiple processor cores included therein.

Processor 401 may represent one or more general-purpose processors such as a microprocessor, a central processing unit (CPU), or the like.

More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets.

Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device.

For example, executable code and/or data of a variety of operating systems, device drivers, firmware (e.g., basic input/output software or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMAX transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor

401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing data stored by a data processing system, the method comprising:
   identifying, by a management controller of the data processing system, an occurrence of a backup event for the data stored in hardware resources of the data processing system, the occurrence indicating that a portion of the data is to be backed up to a storage system that is remote to the data processing system;
   initiating, by the management controller and responsive to the occurrence, a backup process to obtain a backup data package for the data processing system based, at least in part, on the data, wherein in an instance of the initiating where the backup data package is stored in a currently depowered storage device of the data processing system, the management controller powers on the currently depowered storage device of the data processing system to obtain the data associated with the backup data package; and
   providing, by the management controller and via an out-of-band communication channel between the management controller and the storage system, the backup data package to the storage system to facilitate storage of the backup data package in the storage system and completion of the backup process, the completion of the backup process placing the data in a restorable state to enable continued provisioning of computer-implemented services by the data processing system.

2. The method of claim 1, wherein the backup event is a failure of a management entity hosted by the hardware resources.

3. The method of claim 2, wherein the backup data package comprises diagnostic data usable to attempt to identify a root cause of the failure of the management entity, and the management entity is an operating system.

4. The method of claim 1, wherein the backup event is triggered and initiated by a reception, by the management controller and directly from the storage system, of a backup generation data package that indicates that a full backup of the data is to be generated and stored in the storage system, the management controller being separate from a basic input/output system (BIOS) of the data processing system.

5. The method of claim 4, wherein the backup data package comprises an image of the data of the data processing system.

6. The method of claim 4, wherein, during the backup event, a management entity tasked with managing operation of the hardware resources is inoperable.

7. The method of claim 1, wherein the backup event is a reception, by the management controller and from the storage system, of a backup generation data package that indicates that an incremental backup of the data is to be generated and stored in the storage system.

8. The method of claim 7, wherein the backup data package comprises at least one change made to the data after a last backup of the data was generated.

9. The method of claim 7, wherein, during the backup event, a management entity tasked with managing operation of the hardware resources is operable.

10. The method of claim 1, wherein the backup event is an identification, by the management controller, that a backup policy obtained via the out-of-band communication channel has been triggered.

11. The method of claim 1, wherein the data processing system comprises a single network module adapted to separately advertise network endpoints for the management controller and the hardware resources, the single network module being separate from and shared by both the management controller and the hardware resources.

12. The method of claim 11, wherein the network endpoints are usable by the storage system to address communications to the hardware resources and the management controller, and the management controller and the single network module are both on separate power domains from the hardware resources so that the management controller and the single network module are operable while the hardware resources are inoperable.

13. The method of claim 12, wherein the backup data package is provided to the storage system while a portion of the hardware resources are inoperable due to being unpowered.

14. The method of claim 11, wherein the management controller and the single network module are on a first power domain that is separate from a second power domain of the hardware resources where a first power rail supplies power from a power source of the data processing system to the management controller and the network module and a second power rail separate from the first power rail supplies the power from the power source to the hardware resources so that the management controller and the single network module are operable while the hardware resources are inoperable when the power is supplied only on the second power rail, and the management controller controls a supplying of the power to the first power rail and the second power rail by the power source.

15. A non-transitory machine-readable medium having instructions stored therein, which when executed by a processor, cause the processor to perform operations for managing data stored by a data processing system, the operations comprising:
identifying, by a management controller of the data processing system, an occurrence of a backup event for the data stored in hardware resources of the data processing system, the occurrence indicating that a portion of the data is to be backed up to a storage system that is remote to the data processing system;
initiating, by the management controller and responsive to the occurrence, a backup process to obtain a backup data package for the data processing system based, at least in part, on the data, wherein in an instance of the initiating where the backup data package is stored in a currently depowered storage device of the data processing system, the management controller powers on the currently depowered storage device of the data processing system to obtain the data associated with the backup data package; and
providing, by the management controller and via an out-of-band communication channel between the management controller and the storage system, the backup data package to the storage system to facilitate storage of the backup data package in the storage system and completion of the backup process, the completion of the backup process placing the data in a restorable state to enable continued provisioning of computer-implemented services by the data processing system.

16. The non-transitory machine-readable medium of claim 15, wherein the backup event is a failure of a management entity hosted by the hardware resources.

17. The non-transitory machine-readable medium of claim 16, wherein the backup data package comprises diagnostic data usable to attempt to identify a root cause of the failure of the management entity, and the management entity is an operating system.

18. A data processing system, comprising:
a processor; and
a memory coupled to the processor to store instructions, which when executed by the processor, cause the processor to perform operations for managing data stored by the data processing system, the operations comprising:
identifying, by a management controller of the data processing system, an occurrence of a backup event for the data stored in hardware resources of the data processing system, the occurrence indicating that a portion of the data is to be backed up to a storage system that is remote to the data processing system;
initiating, by the management controller and responsive to the occurrence, a backup process to obtain a backup data package for the data processing system based, at least in part, on the data, wherein in an instance of the initiating where the backup data package is stored in a currently depowered storage device of the data processing system, the management controller powers on the currently depowered storage device of the data processing system to obtain the data associated with the backup data package; and providing, by the management controller and via an out-of-band communication channel between the management controller and the storage system, the backup data package to the storage system to facilitate storage of the backup data package in the storage system and completion of the backup process, the completion of the backup process placing the data in a restorable state to enable continued provisioning of computer-implemented services by the data processing system.

19. The data processing system of claim 18, wherein the backup event is a failure of a management entity hosted by the hardware resources.

20. The data processing system of claim 19, wherein the backup data package comprises diagnostic data usable to attempt to identify a root cause of the failure of the management entity, and the management entity is an operating system.

* * * * *